March 4, 1952 — A. S. VOLPIN — 2,587,933
SHEAR RELIEF VALVE
Filed July 1, 1946 — 2 SHEETS—SHEET 1

ALEXANDER S. VOLPIN.
INVENTOR.

BY Lester B. Clark
& Ray L. Smith
ATTORNEYS

ALEXANDER S. VOLPIN
INVENTOR.

Patented Mar. 4, 1952

2,587,933

UNITED STATES PATENT OFFICE 2,587,933

SHEAR RELIEF VALVE

Alexander S. Volpin, Houston, Tex.

Application July 1, 1946, Serial No. 680,750

3 Claims. (Cl. 137—53)

The invention relates to a shear relief valve of the type which will effect release of accumulating pressures when a predetermined pressure is reached so that relief of such pressure is then accomplished.

Devices of the type embodying the present invention are often employed upon fluid pressure lines and particularly where inadvertent circumstances may cause an excessive and unexpected increase in pressure. The valve is then adapted to release the accumulation of pressure and can then be reset readily for a subsequent emergency.

It is one of the objects of the invention to provide a shear relief valve wherein the pressure acting to shear the valve is applied to a constant piston area at all times.

Another object of the invention is to provide a removable unit for shear relief valves wherein the seal may be replaced with a minimum of effort.

Still another object of the invention is to provide a removable unit for shear relief valves which contains both the packing and the shear member so that resetting of the valve may be easily accomplished.

Another object of the invention is to provide a shear relief valve wherein the pressure is applied to a movable piston or plunger having the seal members in engagement with the periphery thereof.

Still another object of the invention is to provide a support cage for shear relief valves wherein a lip type packing provides a seal with the plunger in such a manner that the packing is easily reset upon resetting of the plunger.

Still another object of the invention is to provide a shear relief valve having an exterior stop construction for shielding the plunger so as to avoid damage or injury due to the sudden release of the plunger stem.

Still another object of the invention is to provide a cage for shear relief valves so that most of the parts, including the plunger, plunger seal and shear members, will be incorporated in such unit.

Another object of the invention is to provide a shear relief valve having a movable plunger wherein any pressure moving along the periphery of the plunger will act to seal the plunger and act to prevent leakage.

Other and further objects of the invention will be readily apparent when the following description is considered in connection with the accompanying drawings, wherein.

Figure 2:
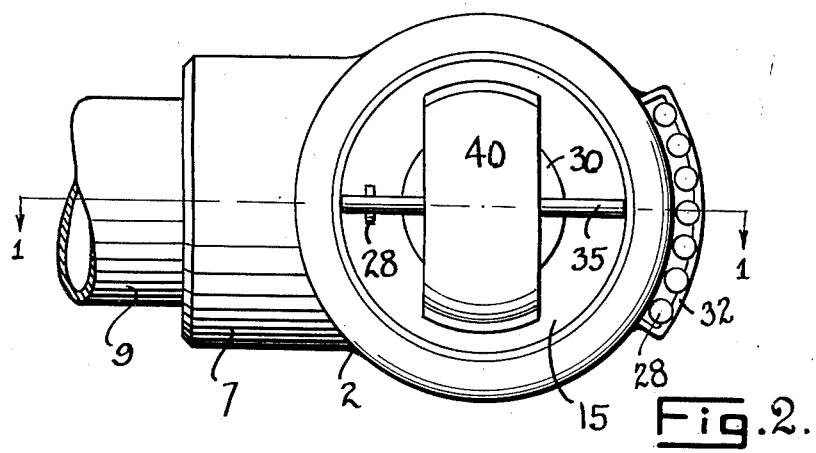
Fig. 2 is a top plan view looking down on the construction of Fig. 1.
Figure 1:
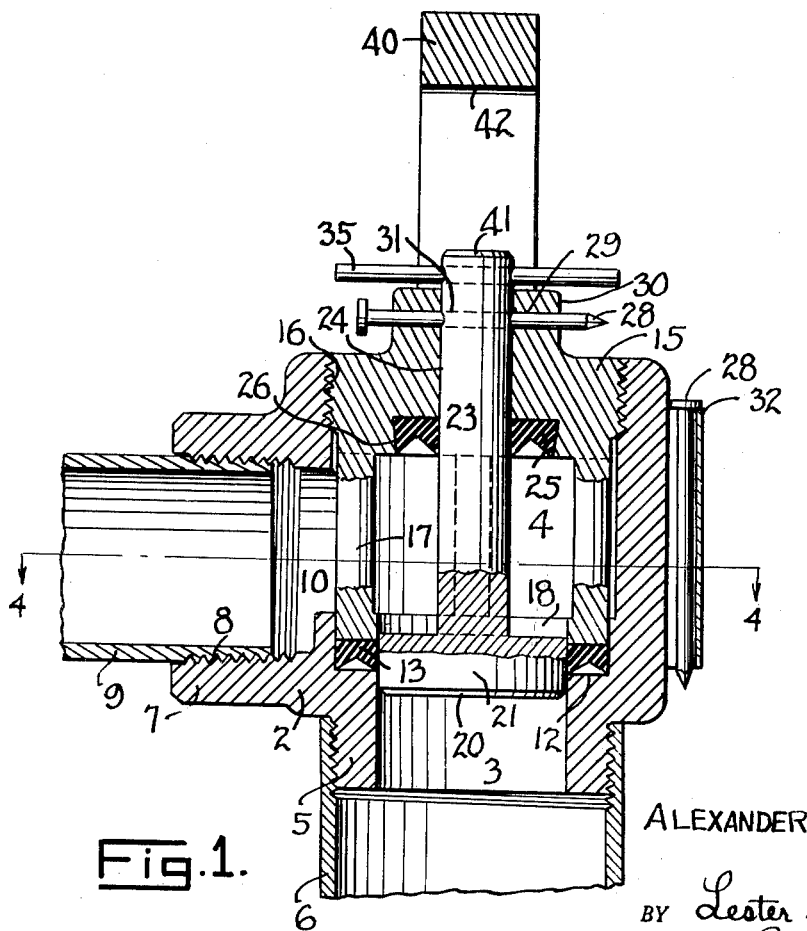
Fig. 1 is a vertical sectional view showing the relief valve in operating position.

In Fig. 1 the body 2 is generally in the form of a cylindrical member having a passage 3 extending entirely therethrough and enlarged to form a chamber 4. The passage is defined by the extending threaded extension 5 which is arranged to receive the pipe 6 in which the pressure is confined by the relief valve.

The body 2 has the lateral extension 7 which is internally threaded at 8 to receive the discharge or outlet pipe 9. A relief passage 10 intersects the main passage 3 so that when the valve is released, the flow of pressure will be through the passage 3 and into the relief passage 10.

The chamber 4 is somewhat larger than the entrance passage 3 to define a shoulder 12 which is arranged to receive the packing ring 13 held in place by a cage or unit 15. This unit is in the form of a plug threaded at 16 and having the studs 17 supporting a ring 18 which acts as a backing for the packing 13. This packing is shown as of a lip type so that any pressure moving through the passage 5 and around the plunger 20 will tend to expand the packing and form a seal with the periphery 21 of the plunger. The plunger is supported by a stem 23 movable through an opening 24 in the plug 15. A suitable seal or packing 25 is arranged in the recess 26 in the head of the plug so that any pressure in the chamber 4 will provide a seal about the stem.

In order to hold the stem 23 and the plunger 20 in the position shown in Fig. 1, a shear member 28 has been passed through an opening 29 in the extension 30 on the plug 15. The opening 31 through the stem receives this shear member 28 so that it can be readily replaced when the plunger is reset. It seems obvious that the openings 29 and 31 may be of suitable size to receive the shear members having different shearing strengths or different sizes of nails.

A small rack 32 affixed to the body is arranged to receive a number of the shear members 28 so that the proper size shear members may be available. Such a rack is of advantage, for instance, in the oil fields, where a rough neck on the rig may pick up an ice pick or file and insert it in the shear opening in resetting the valve just because such a member is handy. Of course the insertion of any such member would alter the pressure at which the valve would release and as a matter of fact, possibly destroy the entire purpose of the valve. The availability of the proper sized nails is therefore important.

The cross bar 35 passes through the end of the stem 23 and may be used in turning the plunger and in resetting the valve.

Figure 3:
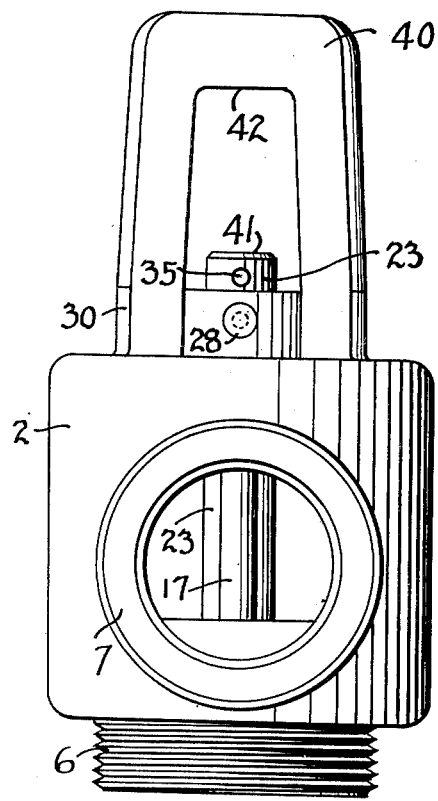
Fig. 3 is an end view showing the shear relief valve in elevation.

In order to provide a safety feature and prevent undue stresses on the parts, a yoke or bridge 40 is shown as being formed integrally with the plug. This bridge spans the end of the stem as best seen in Fig. 3 and is of a strength such that the end 41 of the stem will strike the inside face 42 of the bridge. In this manner the stem will not inadvertently strike a person or other object which might be close to the valve. As a matter of fact, several bad accidents have occurred due to the impact of the end of a stem with other types of shear relief valves.

Figure 4:
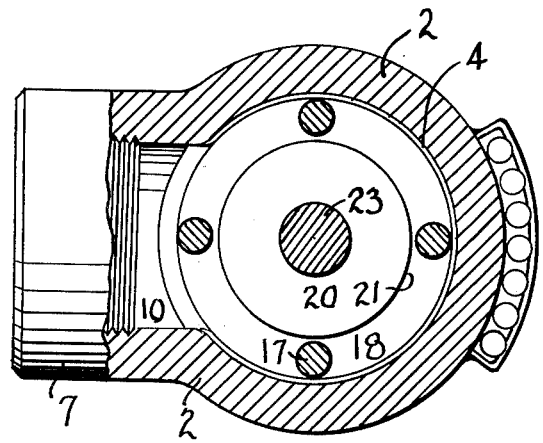
Fig. 4 is a transverse sectional view taken on the line 4—4 of Fig. 1.

As best seen in Fig. 4, the cage 15 is opened so as to allow the flow of fluid through the passage 3 into the chamber 4 and out of the exhaust passage 10 when the plunger 20 has been forced from its closed position as seen in Fig. 1. In actual operation, the pressure will be applied to the exposed face of the plunger 20 in the passage 3. The seeping of this pressure along the periphery 21 of the plunger causes the lip packing 13 to expand so as to provide a seal around the plunger. In event the pressure in the passage 3 builds up beyond the predetermined amount which has been calculated to shear the member 28, then of course the plunger will move under such pressure and release the valve by shearing of the member 28. The sealing action releases the stem 23 so that the plunger snaps sharply back into the chamber 4 so that the end 41 strikes the surface 42 of the yoke. This stops the movement of the plunger and the pressure in the passage 3 is released as the plunger moves on through the ring 18 into the chamber 4.

A particular advantage of the construction is the replaceability of the cage unit 15 in that the cage may be quickly removed by inserting any sort of a bar in the bridge 40 and turning the plug loose from the body while the valve remains in position in the pipe. A new unit may be screwed in immediately and the valve is then ready for service. If desired, however, the same unit may be reinserted, using the same packing 13 and 25 if desired and immediately replacing the shear member 28.

The arrangement of the structure adapts itself to long service because of the fact that the packing ring 13 will be squeezed or forced back to its normal position upon the resetting of the plunger because the plunger moves into this packing 13 toward the lip portion thereof and should the lip have been extended due to the previous releasing of the plunger, the lip will now be compressed as the plunger is reset so that as a matter of fact, a used packing ring 13 serves equally as well as a new ring in providing a seal about the plunger.

Broadly the invention contemplates a shear relief valve wherein safety and economy have been provided and wherein a minimum of replacement parts will be required.

What is claimed is:

1. A shear relief valve including a body, a lateral boss thereon, communicating passages through said body and boss, a plug in one end of the passage in said body, a cage on said plug fitting into said body passage so as to provide an angle passage with said boss passage through said body, a seal retained in said body and about said passage by said cage, a plunger, a stem therefor slidable in said plug, shear means in said plug retaining said stem and plunger in position closing said angle passage and engaging said seal, and stop means extending outwardly on said plug in the line of movement of said stem to limit the movement of said stem and plunger upon shearing of said means.

2. A stop plug and cage for the body of shear relief valves comprising a plug, a cage extending therefrom having an open end, an opening through said plug, a plunger slidable in said cage, and closing said open end, a stem on said plunger slidable in said opening, shear means on said plug extending through said stem to retain the plunger in closed position and a stop bridge projecting exteriorly on said plug in the line of movement of said stem to limit the movement of and enclose said stem upon shearing of said means.

3. A shear relief valve including a body, a lateral boss thereon, communicating passages through said body and boss, a plug in one end of the passage in said body, a cage on said plug fitting into said body passage so as to provide an angle passage with said boss passage through said body, a seal retained in said body and about said passage by said cage, a plunger, a stem therefor slidable in said plug, shear means in said plug retaining said stem and plunger in position closing said angle passage and engaging said seal, stop means to limit the movement of said stem and plunger upon shearing of said shear means comprising a yoke member mounted on said plug and extending outwardly from said plug in the line of movement of said stem.

ALEXANDER S. VOLPIN.

REFERENCES CITED

The following references are of record in the file of this patent:

UNITED STATES PATENTS

| Number | Name | Date |
|---|---|---|
| 568,680 | Henderson | Sept. 29, 1896 |
| 1,676,650 | Holmes | July 10, 1928 |
| 1,959,822 | Greve | May 22, 1934 |
| 2,071,375 | Allen | Feb. 23, 1937 |
| 2,208,929 | Jaegle | July 23, 1940 |
| 2,303,392 | Scaramucci | Dec. 1, 1942 |
| 2,305,519 | Dunmire | Dec. 15, 1942 |
| 2,453,891 | Burt | Nov. 16, 1948 |

FOREIGN PATENTS

| Number | Country | Date |
|---|---|---|
| 735 | Great Britain | of 1881 |
| 15,885 | Great Britain | of 1899 |
| 748,580 | France | of 1933 |
| 774,538 | France | of 1934 |